US012732420B2

(12) United States Patent
Singh et al.

(10) Patent No.: US 12,732,420 B2
(45) Date of Patent: Sep. 8, 2026

(54) TRACKING SWITCHOVER HISTORY OF SUPERVISORS

(71) Applicant: Arista Networks, Inc., Santa Clara, CA (US)

(72) Inventors: Chetandeep Singh, Pleasanton, CA (US); Itthichok Jangjaimon, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 211 days.

(21) Appl. No.: 17/557,117

(22) Filed: Dec. 21, 2021

(65) Prior Publication Data

US 2023/0198838 A1 Jun. 22, 2023

(51) Int. Cl.
*G06F 15/173* (2006.01)
*H04L 41/0813* (2022.01)

(52) U.S. Cl.
CPC ................................ *H04L 41/0813* (2013.01)

(58) Field of Classification Search
CPC .................................................. H04L 41/0813
See application file for complete search history.

(56) References Cited

U.S. PATENT DOCUMENTS 7,287,180 B1 * 10/2007 Chen ....................... H04L 41/08 714/13
11,190,548 B1 * 11/2021 Liu ........................ H04L 63/20
2005/0213498 A1 * 9/2005 Appanna ................ H04L 45/00 370/216
2006/0262716 A1 * 11/2006 Ramaiah ............. H04L 41/0668 370/216
2010/0098102 A1 * 4/2010 Banks ............... H04W 52/0235 370/406
2012/0192267 A1 * 7/2012 Aizawa ............... G06F 21/6218 726/17
2014/0089619 A1 * 3/2014 Khanna ................. G06F 3/0652 711/166
2014/0286249 A1 * 9/2014 Yamada ............. H04W 72/082 370/329

(Continued)

OTHER PUBLICATIONS

Cisco, Stateful Switcher (SSO), Aug. 4, 2019, Cisco, "https://content.cisco.com/chapter.sjs?uri=/searchable/chapter/www.cisco.com/content/en/us/td/docs/switches/lan/catalyst6500/ios/15-4SY/config_guide//sup2T/15_4_sy_swcg_2T/stateful_switchover.html.xml" (Year: 2019).*

*Primary Examiner* — Dhairya A Patel
*Assistant Examiner* — Eui H Kim
(74) *Attorney, Agent, or Firm* — Tianyi He

(57) ABSTRACT

A method for managing a switchover between an active supervisor and a standby supervisor executing on a network device includes initializing a switchover logger agent executing on the supervisor responsive to the switchover, wherein after the switchover, the supervisor is in an active state, wherein prior to the switchover, the supervisor is in a standby state and the second supervisor is in the active state, and wherein the supervisor assumes management of controlled devices on the network device when in the active state, based on the initialization, obtaining a local switchover record file corresponding to the switchover by the supervisor, updating, by the supervisor, a switchover history file based on the local switchover record file, and updating, by the supervisor, a network device state database instance based on the local switchover record file.

18 Claims, 8 Drawing Sheets

(56) References Cited

U.S. PATENT DOCUMENTS

2015/0074219 A1* 3/2015 Chin ....................... G06F 9/467
709/213
2016/0062350 A1* 3/2016 Prall ..................... H04L 41/042
700/20
2017/0019497 A1* 1/2017 Fujiwara ................ G06Q 10/06
2019/0179645 A1* 6/2019 Prasad .................... H04L 12/65
2023/0107301 A1* 4/2023 Moradi ................... H04L 41/30
706/12

* cited by examiner

TRACKING SWITCHOVER HISTORY OF SUPERVISORS

BACKGROUND

Network devices are typically designed to continue to operate when a portion of the network device fails. More specifically, network devices may have components that are on "standby" and are used, e.g., when the corresponding "active" components fail or need to be upgraded. Conventional network devices are unable to track transitions between the "active" and "standby" components.

DETAILED DESCRIPTION

Figure 1A:
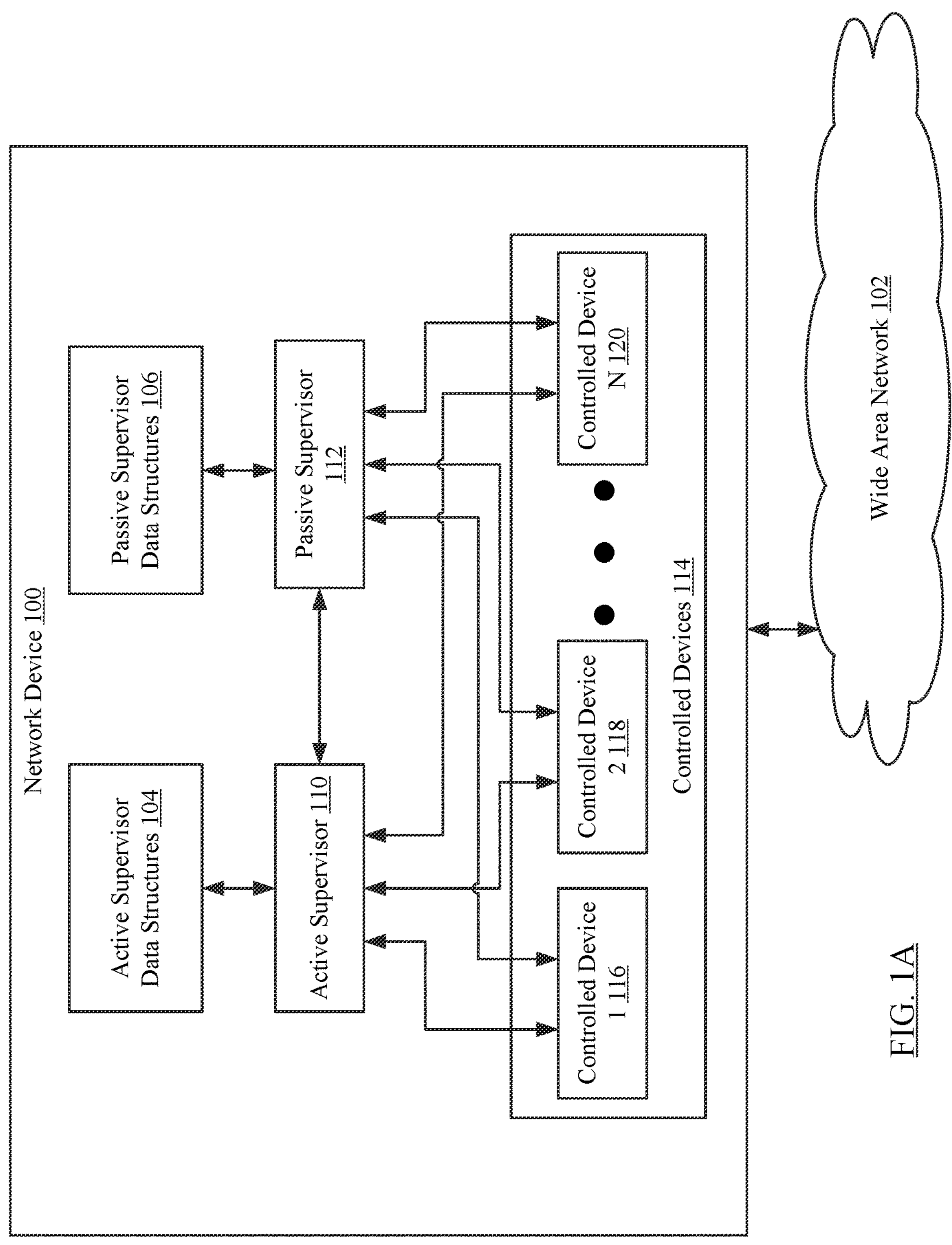
FIG. 1A shows a diagram of a system in accordance with one or more embodiments.

In general, embodiments relate to management of network devices. Network devices may each utilize a supervisor that manages the operation of any number of controlled devices (e.g., line cards). During such operation, a second supervisor (also referred to as the standby supervisor or the passive supervisor) may be on standby, ready to take over operation of the first supervisor should that first supervisor experience a failover. The process of switching the operation from the first supervisor (also referred to as the active supervisor) to the standby supervisor may be referred to as a switchover.

In conventional implementations, a switchover may be initiated by, e.g., a user or occur when a standby supervisor detects that an active supervisor is being rebooted. In such implementations, there is no mechanism to track the history of switchovers (i.e., the switchovers that have occurred overtime). For example, there may be a mechanism in conventional implementations (e.g., a command line interface (CLI)) to obtain information about a most recent switchover. However, such mechanism may not be used to track a switchover history for multiple previous switchovers.

Embodiments disclosed herein enable the tracking and orchestration of a switchover history between two supervisors. Embodiments disclosed therein enable the supervisors to coordinate with each other during each switchover to maintain consistency of the switchover history such that either of the two supervisors may provide an accurate switchover history to a user requesting it. Each switchover specified in the switchover history specifies a switch in roles (also referred to as states) of the two supervisors. For example, the role of active may be switched from a first supervisor to a second supervisor.

Following each switchover, an election manager of the now active supervisor may generate a local switchover record file and a remote switchover record file that correspond to the most recent switchover between the active supervisor and a second supervisor. In one or more embodiments, each switchover record file (i.e., the local switchover record file and the remote switchover file) may specify the previous role of the supervisor, the current role of the supervisor, the previous protocol implemented by the supervisors, the current protocol implemented by the supervisors, a timestamp, and a reason for the switchover. The reason may include, for example, user-initiated, caused by a failover by the previously-active supervisor, and/or policy driven. The switchover records may include additional and/or different information without departing from the technology.

The local switchover record file may specify the current and previous roles relative to the now active supervisor. In contrast, the remote switchover record file may specify the previous and current roles relative to the second supervisor.

In various embodiments, each supervisor includes a switchover logger agent that processes the local or remote switchover record file. The local switchover record file may be processed by the switchover logger agent of the now active supervisor. The remote switchover record file may be processed by the switchover logger agent of the second supervisor. Each switchover logger agent may further update a switchover history file of the respective supervisor using the obtained switchover record file and an instance of the network device state database (also referred to as a network device state database instance) of the respective supervisor.

Embodiments of the disclosure further consider the possibility of a record reconciliation being performed should that be necessary. The record reconciliation is a process for reconciling any conflicting records between the two supervisors in regards to previous and/or most recent switchovers. The conflict in records may be determined based on an obtained switchover record that specifies a previous role (e.g., active or standby) that conflicts with a previous role specified in the switchover history database. The record reconciliation includes generating, by the active supervisor, a local switchover record file, generating a second local record switchover file to be sent to the second supervisor, and updating the switchover history file based on the generated local file.

FIG. 1A shows a system in accordance with one or more embodiments of the disclosure. In one or more embodiments of the disclosure, the system includes a network device (100) that includes an active supervisor (110), a passive supervisor (112), active supervisor data structures (104), passive supervisor data structures (106), and controlled devices (114). As shown in FIG. 1, the controlled devices (114) include controlled device 1 (116), controlled device 2 (118), and controlled device N (120). Each of these components is described below.

In one embodiment of the disclosure, the network device is a physical devices (e.g., a computing device) that include persistent storage, memory (e.g., random access memory), one or more processor(s) (including a switch chip), and two or more physical ports. In one embodiment of the disclosure, the switch chip is hardware that determines which egress port on a network device to forward media access control (MAC) frames. The switch chip may include egress and ingress ports that may connect to ports on the network device. Each port may or may not be connected to another device (e.g., a server, a switch, a router, etc.). The network device may be configured to receive packets via the ports and determine whether to: (i) drop the packet; (ii) process the packet in accordance with one or more embodiments of the disclosure; and/or (iii) send the packet, based on the processing, out another port on the network device. While the aforementioned description is directed to network devices that support Ethernet communication, the disclosure is not limited to Ethernet; rather, the disclosure may be applied to network devices using other communication protocols. For additional details regarding a computing device, see, e.g., FIG. 4.

In one or more embodiments of the disclosure, a controlled device (e.g., controlled device 1 (116), controlled device 2 (118), controlled device N (120)) is any hardware (e.g., circuitry) and/or combination of hardware and software that includes functionality to perform all or any portion of any functionality of the network device (100). In one or more embodiments of the disclosure, a controlled device (e.g., controlled device 1 (116), controlled device 2 (118), controlled device N (120)) is included in a computing device and/or may be operatively connected to a computing device. As used herein, the phrase 'operatively connected' refers to any direct (e.g., wired directly between two devices) or indirect (e.g., wired and/or wireless connections between any number of devices connecting the operatively connected devices) connection. Non-limiting examples of controlled devices are included below.

In one or more embodiments of the disclosure, a computing device is any device or any set of devices capable of electronically processing instructions and may include, but is not limited to, any of the following: one or more processors, memory (e.g., random access memory (RAM)), input and output device(s), persistent storage, one or more physical interfaces (e.g., network ports), any number of other hardware components (not shown) (e.g., light emitting diodes (LEDs), optical transceivers, network chips, etc.) or any combination thereof. Examples of computing devices include, but are not limited to, a server (e.g., a blade-server in a blade-server chassis, a rack server in a rack, etc.), a desktop computer, a mobile device (e.g., laptop computer), a network device (e.g., switch, router, multi-layer switch, etc.) and/or any other type of computing device with the aforementioned requirements.

In one or more embodiments of the disclosure, a controlled device (e.g., controlled device 1 (116), controlled device 2 (118), controlled device N (120)) is any single device, any component of a device, any aggregate of devices, any aggregate of components of a device, or any aggregate of components of multiple devices. Thus, as used herein, multiple devices and/or components may collectively be termed a "controlled device".

Examples of a controlled device (e.g., controlled device 1 (116), controlled device 2 (118), controlled device N (120)) include, but are not limited to, a switch, a line card, a fabric card, an individual port on line card, a central processing unit (CPU), a system control device (SCD), a supervisor (described below), a power supply unit (PSU), a network chip, a router, an access point, a computing device, a fan, an optical transceiver, a light emanating device (e.g., a LED), a Power Over Ethernet (POE) port and/or device, any multiple of these devices, or any other device(s) that may be powered by a PSU. As another example, a controlled device (e.g., controlled device 1 (116), controlled device 2 (118), controlled device N (120)) may be an aggregation of multiple components of two or more devices (e.g., various display indicator LEDs of multiple devices). Further, an SCD may be a device that interacts with software (e.g., agents) and provides the ability to control any type of component of the system.

In one or more embodiments of the disclosure, a supervisor (e.g., active supervisor (110), passive supervisor (112)) is any hardware (e.g., circuitry), software, firmware, and/or combination thereof that includes functionality to receive information (e.g., from PSUs, controlled devices (114), etc.) and/or perform one or more actions related to power in a computing device (e.g., interacting with the controlled devices, interacting with controlled devices (114), storing power related information, sending messages in response to power conditions, etc.). In one or more embodiments of the disclosure, a supervisor includes functionality to receive, organize, interpret, store, and/or take one or more actions in response to information regarding devices (e.g., controlled devices (114)) to which it is operatively connected. Further, in one or more embodiments of the disclosure, a supervisor may be able to send commands to any device to which it is operatively connected.

Examples of a supervisor include, but are not limited to, software, a SCD, any one or more integrated circuits (ICs), a field programmable gate array (FPGA), an application specific integrated circuit (ASIC), a microcontroller, any device capable of being programmed with device logic and/or capable of executing instructions for performing various operations, and/or any combinations thereof.

Additionally, as shown in FIG. 1A, each supervisor (110, 112) may independently operatively connect to each controlled device (116, 118, 120). Further, the active supervisor (110) and the passive supervisor (112) may be operatively connected to each other. The operative connections between each supervisor (110, 112) and each controlled device (116, 118, 120) may occur over a single wire, any multiple of wires, and/or wirelessly. One of ordinary skill in the art and having the benefit of this disclosure would appreciate that any form of suitable communication between the supervisors (110, 112) and the controlled devices (116, 118, 120) may be employed. Further, each supervisor (110,112) may not be connected to each controlled device (116, 118, 120) independently. Rather, the supervisors (110, 112) may share connections between each controlled device (116, 118, 120). Additionally, certain controlled devices (116, 118, 120) may be connected to only one supervisor (e.g., active supervisor (110)), while other controlled devices (116, 118, 120) may be connected to another supervisor (e.g., passive supervisor (112)).

In one or more embodiments, the active supervisor (110) and the passive supervisor (112) are operatively connected to enable communication between the two supervisors (110, 112). Further, as each supervisor (110, 112) may be independently connected to each controlled device (116, 118, 120) and each PSU (104, 106, 108), each supervisor (110, 112) may independently collect data from each controlled device (116, 118, 120). Therefore, for example, if the communication between the active supervisor (110) and any one particular controlled device (116, 118, 120) becomes severed (or the data transmitted therein becomes otherwise unreadable) the active supervisor (110) may then be able to query the passive supervisor (112) to obtain that missing or corrupt data. Conversely, the passive supervisor (112) may be able to query the active supervisor (110) to obtain any data that is missing, unavailable, or otherwise corrupt.

In one or more embodiments, the active supervisor (110) may manage the operation of the controlled devices (114) while in an active mode. The active mode may refer to a setting of the active supervisor (110) to perform the functionality of the active supervisor (110) that may include, for example, managing the power consumption of the controlled devices (114), managing the computing usage of the controlled devices (114), and/or any other management of the controlled devices (114). In contrast, the passive supervisor (112) may operate in a passive mode. The passive mode may refer to a setting in which the passive supervisor (112) is on standby to wait to take on the active mode should the active supervisor (110) be unable to continue the operation of the active mode.

In one or more embodiments, the role of active supervisor may be switched between the two supervisors (110, 112). The active mode may be switched from one supervisor (e.g., the active supervisor (110)) to the second supervisor (e.g., the passive supervisor (112)). The switching of the active mode from one supervisor to another may be referred to as a switchover. In this manner, while one supervisor is labelled as an active supervisor (110), and a second supervisor is labelled as a passive supervisor (112), either of the two supervisors may serve the role of active supervisor or passive supervisor at a point in time. Said another way, the active mode may be operated by either of the two supervisors (e.g., 110, 112) and thus serve the role of active supervisor. In contemporary operations, at least one of the two supervisors (110, 112) is to perform the role of active supervisor. Further, in contemporary operations, only one of the supervisors may perform the operation of the active supervisors. Without departing from the disclosure, any number of supervisors may perform the operations of the active supervisor without departing from the disclosure.

In one or more embodiments, while not shown in FIG. 1A, each supervisor (110, 112) includes an election manager and a switchover logger agent. The election manager may include functionality for reacting to a notification of a switchover. The reaction may be performed in accordance with FIG. 2A. The switchover logger agent may include functionality for tracking the switchover. The tracking may be performed using the supervisor data structures (see FIG. 2B). The switchover logger agent may track the switchover in accordance with FIGS. 2B and 2C.

In one or more embodiments, a system such as that shown in FIG. 1, also includes software and/or firmware stored in any data repository (not shown) and/or memory (not shown) (i.e., non-transitory computer readable mediums). Such software and/or firmware may include instructions which, when executed by the one or more processors (not shown) of the system, cause the one or more processors to perform operations in accordance with one or more embodiments of the disclosure. The instructions may be in the form of computer readable program code to perform embodiments of the disclosure, and may be stored, in whole or in part, temporarily or permanently, on a non-transitory computer readable medium such as optical media (e.g., compact disc (CD), digital versatile disc (DVD), etc.), magnetic storage (e.g., hard disk drive (HDD), floppy disk, tape, diskette, etc.), integrated circuit storage (e.g., flash memory, solid-state drive (SSD), etc.), storage device, physical memory, or any other computer readable storage medium.

In one or more embodiments of the disclosure, each of the supervisors (110, 112) manage data structures. Active supervisor data structures (104) may be managed by the active supervisor (110), and the passive supervisor data structures (106) may be managed by the passive supervisor (112). The supervisor data structures (104, 106) may include switchover history record files, network device databases, and/or other data structures without departing from the disclosure. For additional details regarding the supervisor data structures, see, e.g., FIG. 1B.

While FIG. 1A shows a configuration of components, other configurations may be used without departing from the scope of the disclosure. For example, although PSUs (102) is displayed with only three PSUs (PSU 1 (104), PSU 2 (106), and PSU N (108)), one of ordinary skill in the art and having the benefit of this Detailed Description would appreciate that there can be any number of PSUs in the disclosed system to provide power. Similarly, although controlled devices (114) is shown with only three distinct devices, controlled device 1 (116), controlled device 2 (118), and controlled device N (120), one of ordinary skill in the art and having the benefit of this Detailed Description would appreciate that there can be any number of controlled devices in the disclosed system. As another example, although FIG. 1A shows an active supervisor (110) and a passive supervisor (112), there may be only one supervisor, or more than two supervisors, in the system. Accordingly, embodiments disclosed herein should not be limited to the configuration of components shown in FIG. 1A.

Figure 1B:
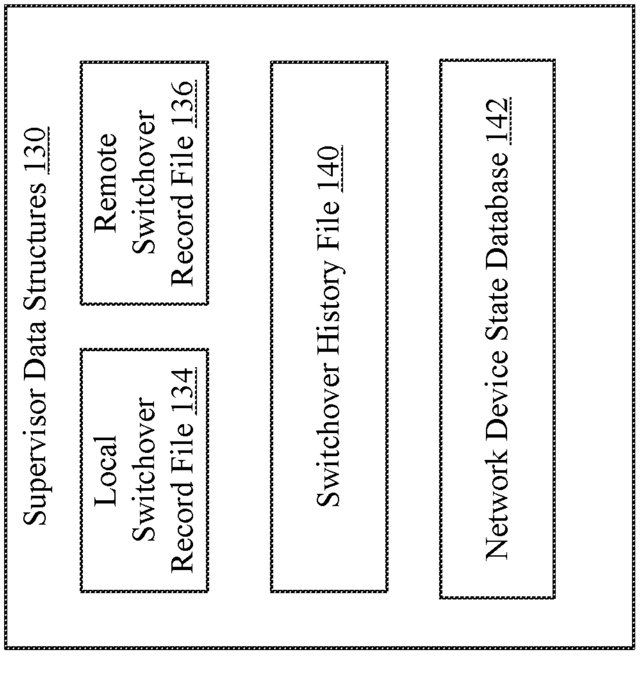
FIG. 1B shows a diagram of a supervisor in accordance with one or more embodiments.

FIG. 1B shows a diagram of supervisor data structures in accordance with one or more embodiments. The supervisor data structures may be an embodiment of the active supervisor data structures (104, FIG. 1A) or the passive supervisor data structures (106, FIG. 1A) without departing from this disclosure. The supervisor data structures (130) may include a local switchover record file (134), a remote switchover record file (136), a switchover history file (140), and a network device state database (142). The supervisor data structures (130) may be managed by one of the two supervisors (e.g., 110, 112, FIG. 1A) discussed above. The management may include, for example, the generation and/or access of one or more of the data structures.

In one or more embodiments, the local switchover record file (134) is a data structure that specifies details about the most recent switchover. The local switchover record file (134) may be intended to be read by the supervisor. Specifically, a switchover logger agent operating on the supervisor may be the reader of the local switchover record file (134). The supervisor may generate the local switchover record file (134) in response to detection of a switchover. For example, the supervisor may include an election manager that obtains the detection of the switchover. The election manager may generate the local switchover record file (134) in accordance with FIG. 2A. In one or more embodiments, the local switchover record file (134) may specify the previous role of the supervisor, the current role of the supervisor, the previous protocol implemented by the supervisors, the current protocol implemented by the supervisors, a timestamp, and a reason for the switchover.

In one or more embodiments, the remote switchover record file (136) is a data structure that specifies details about the most recent switchover. In contrast to the local record switchover file (134), the remote switchover record file (136) is intended to be read by a second supervisor (e.g., a supervisor other than the supervisor managing the supervisor data structures (130)). For example, the second supervisor may include a switchover logger agent that accesses, e.g., via a remote agent, the remote switchover record file (136).

In one or more embodiments, the local switchover record file (134) and/or the remote switchover record file (136) is used to update the network device state database (142).

In one or more embodiments, the switchover history file (140) is a data structure that specifies a number of previous switchovers. The previous switchovers may be one or more of the most recent switchovers that have taken place for the supervisor as recorded by the supervisor. The switchover history file (140) may be updated in accordance with FIGS. 2A-2C. The switchover history file (140) may include any number of entries that each correspond to a switchover. For additional details regarding the switchover history file, see, e.g., FIG. 1C.

In one or more embodiments of the invention, the switchover history file (140) may be accessed and configured via a user interface. For example, a command line interface (CLI) may include a second CLI command that specifies accessing the N most recent switchover entries, wherein N is any positive integer specified in the CLI command A second CLI command may specify deleting any number of switchover entries. A third CLI command may specify clearing all switchover entries in the switchover history file (140). Other CLI commands may be introduced to access and/or otherwise modify the switchover history file (140) without departing from the invention.

In one embodiment of the disclosure, the network device state database (142) includes the current state of the network device and/or of the supervisor. The state information stored in the network device state database (142) may include, but is not limited to: (i) information about (and/or generated by) all (or a portion of the) services currently executing on the network device and/or by the supervisor; (ii) the version of all (or a portion of the) software executing on the supervisor; (iii) the version of all firmware on the network device and/or supervisor; (iv) hardware version information for all (or a portion of the) hardware in the network device; (v) information about the current state of all (or a portion of the) tables (e.g., routing table, forwarding table, etc.) in the network device that are used to process packets, where information may include the current entries in each of the tables, (vi) information about all (or a portion of the) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features, and (v) the designation of each of the supervisors as active or passive. In one embodiment of the disclosure, the network device state database (142) includes control plane state information associated with the control plane of the supervisor. Further, in one embodiment of the disclosure, the network device state database (142) includes data plane state information (discussed above) associated with the data plane of the supervisor. The network device state database (142) may include other information without departing from the disclosure.

In one embodiment of the disclosure, the network device state database (142) may be implemented using any type of database (e.g., a relational database, a distributed database, etc.). Further, the network device state database (142) may be implemented in-memory (i.e., the contents of the state database may be maintained in volatile memory). Alternatively, the network device state database (142) may be implemented using persistent storage. In another embodiment of the disclosure, the network device state database (142) may be implemented as an in-memory database with a copy of the state database being stored in persistent storage. In such cases, as changes are made to the in-memory database, copies of the changes (with a timestamp) may be stored in persistent storage. The use of an in-memory database may provide faster access to the contents of the network device state database (142).

Those skilled in the art will appreciate that while the term "database" is used above, the network device state database (142) may be implemented using any known or later developed data structure(s) to manage and/or organize the content in the state database.

Figure 1C:
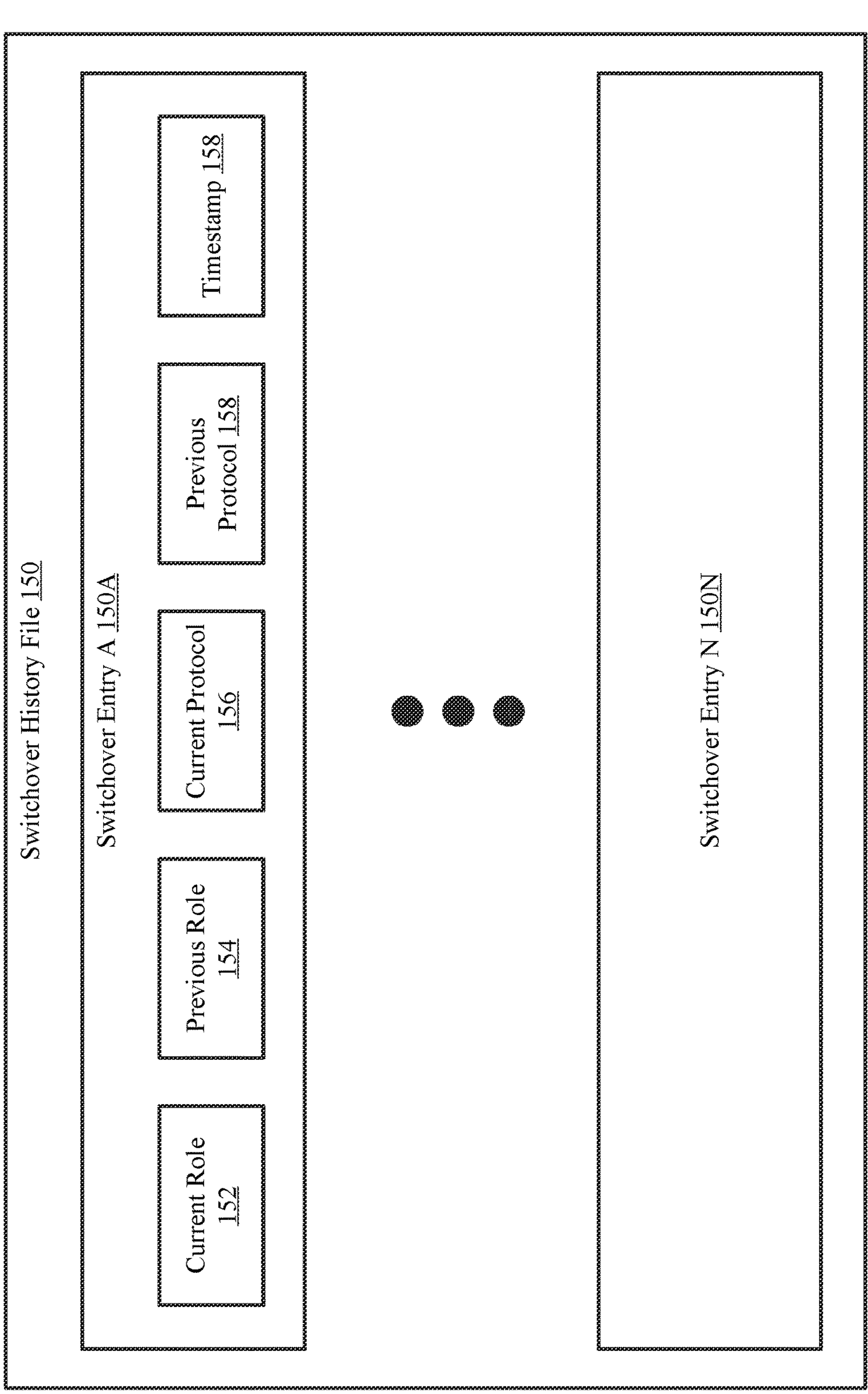
FIG. 1C shows a diagram of a switchover history file in accordance with one or more embodiments.

FIG. 1C shows a diagram of a switchover history file. The switchover history file (150) may be an embodiment of the switchover history file (140, FIG. 1B) discussed above. As discussed above, the switchover history file (150) is a data structure that may include a number of previous switchovers. The switchover history file (150) may include any number of switchover entries (150A, 150N). Each switchover entry (150A, 150N) may include a current role (152), a previous role (154), a current protocol (156), a previous protocol (158), and a timestamp (158). Each switchover entry (150A, 150N) may include additional, fewer, and/or different information without departing from this disclosure.

The current role (152) specified in a switchover entry (150A) of the switchover history file (150) may specify the role that the supervisor was switched to following the corresponding switchover of the switchover entry (150A, 150N). Such role may be, for example, the active role or the standby role. In contrast, the previous role (154) in the switchover entry (150A, 150N) specifies the role from which the supervisor was switched following the corresponding switchover.

The current protocol (156) of the switchover entry (150A, 150N) may specify the protocol implemented by the supervisor after the corresponding switchover. Examples of switchover protocols may include, but are not limited to: simplex, route processor redundancy (RPR), and stateful switchover (SSO). In contrast, the previous protocol (158) may specify the protocol implemented by the supervisor prior to the corresponding switchover.

In one or more embodiments, a simplex protocol relates to a supervisor protocol in which a unidirectional transmission of data is managed. In the simplex protocol, only one supervisor may be implemented in the network device. In such scenarios in which the current role (156) specifies a simplex protocol, the result may be only one supervisor being implemented in the network device. Such a supervisor may perform the active role.

In one or more embodiments, the RPR protocol relates to a supervisor protocol in which the state information of the network device state database of the active supervisor is not synchronized with the standby supervisor. In such embodiments, a synchronization may need to be performed before the switchover is complete. For example, a synchronization of the instances of network device state databases may be initiated in response to a switchover notification.

In one or more embodiments, the SSO protocol relates to a supervisor protocol in which there is a periodic synchronization between the instances of the network device state databases of the active and standby supervisor. In this manner, the standby supervisor may be on a "hot standby". That is, the standby supervisor may be ready to take over the role of active when the switchover is initiated.

The timestamp (158) may specify a point in time in which the corresponding switchover occurs.

In one or more embodiments, the supervisors may further include functionality for consolidating repeating switchover entries (150A, 150N). In this manner, the switchover history file (150) does not include multiple entries of the same switchover.

Figure 2A:
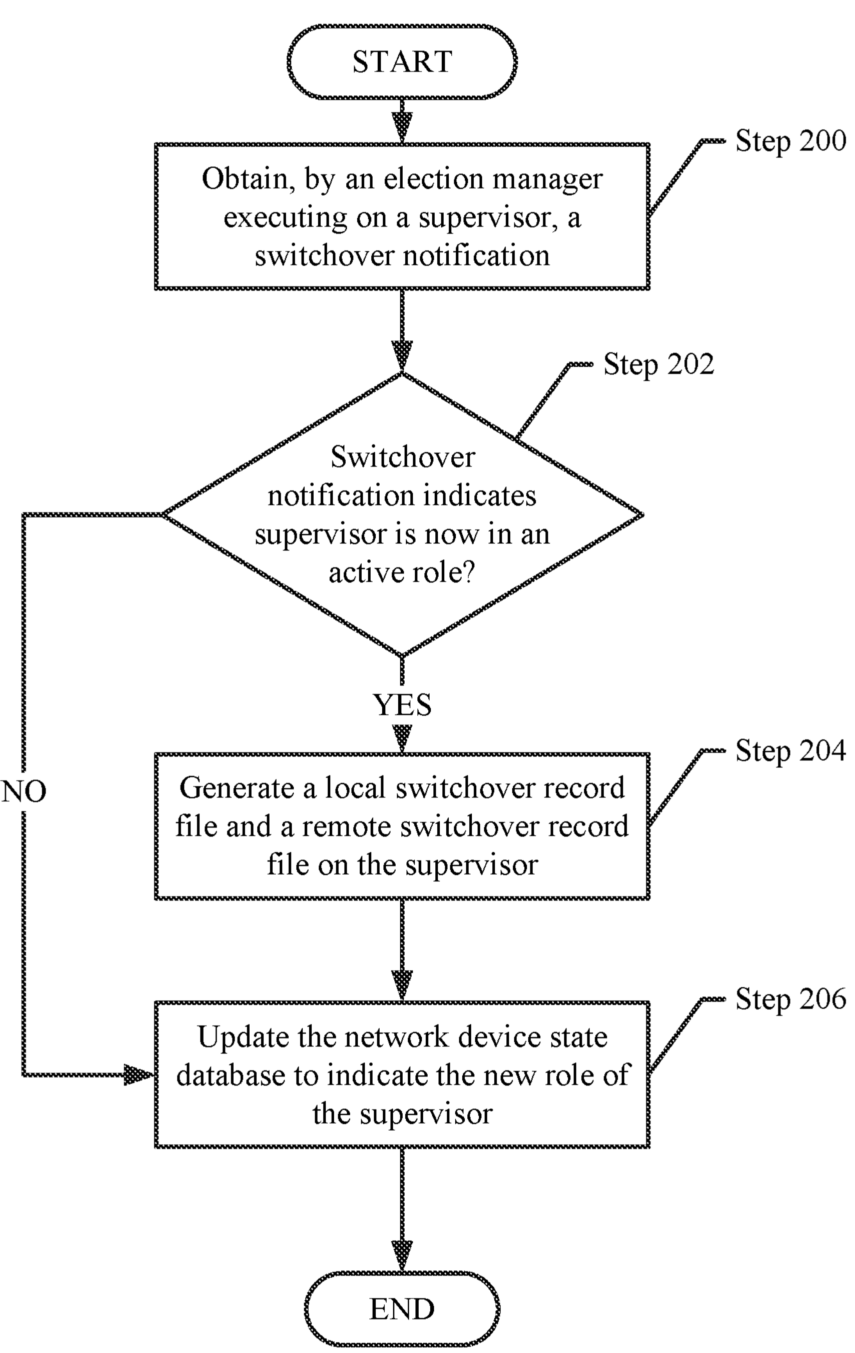
FIG. 2A shows a flowchart for a method for initiating a switchover of a supervisor in accordance with one or more embodiments.

FIG. 2A shows a flowchart for a method for initiating a switchover in accordance with one or more embodiments. The method of FIG. 2A may be performed by, for example, a supervisor (e.g., 110, 112, FIG. 1A). Other components illustrated in FIGS. 1A-1C may perform the method of FIG. 2A without departing from the disclosure. Further, one or more steps in FIG. 2A may be performed concurrently with one or more steps in FIGS. 2A-2C.

Turning to FIG. 2A, in step 200, a switchover notification is obtained by an election manager executing on the supervisor. In one or more embodiments of the disclosure, the switchover notification is in response to a switchover being initiated. The switchover may be initiated based on, for example: a failover of the current active supervisor, a request by an administrative system to switch the roles of the two supervisors, a failure of an expected active supervisor to boot, or a policy that specifies a periodic switchover to be implemented. The result of the switchover may be a switchover notification either generated by one of the two supervisors or by the administrative system initiating the switchover. The election manager may detect the switchover using the switchover notification.

In step 202, a determination is made about whether the switchover notification indicates the supervisor is now in an active role. If the switchover notification indicates the supervisor is now in an active role, the method proceeds to step 204; otherwise, the method proceeds to step 206.

In step 204, a local switchover record file and a remote switchover record file are generated. In one or more embodiments, the local switchover record file and the remote switchover record file are generated to specify information regarding the switchover. The information may include, for example, the current role of the supervisor, the previous role of the supervisor, the current and/or previous protocols implemented by the supervisors, and a timestamp corresponding to a point in time of the switchover.

In one or more embodiments, each of the switchover record files (e.g., the remote switchover file and the local switchover file) specify the information relative to the supervisor intended to read the corresponding switchover record file. For example, the supervisor executing the election manager is intended to read the local switchover record file. In this example, the current role and previous role specified in the local switchover record file relate to the supervisor. In contrast, a second supervisor is intended to read the remote switchover record file. In this example, the current role and previous role specified in the remote switchover record file relate to the second supervisor.

In step 206, the network device state database is updated to indicate the new role of the supervisor. In one or more embodiments, the network device state database is updated to specify the current role as indicated by the switchover notification.

Figure 2B:
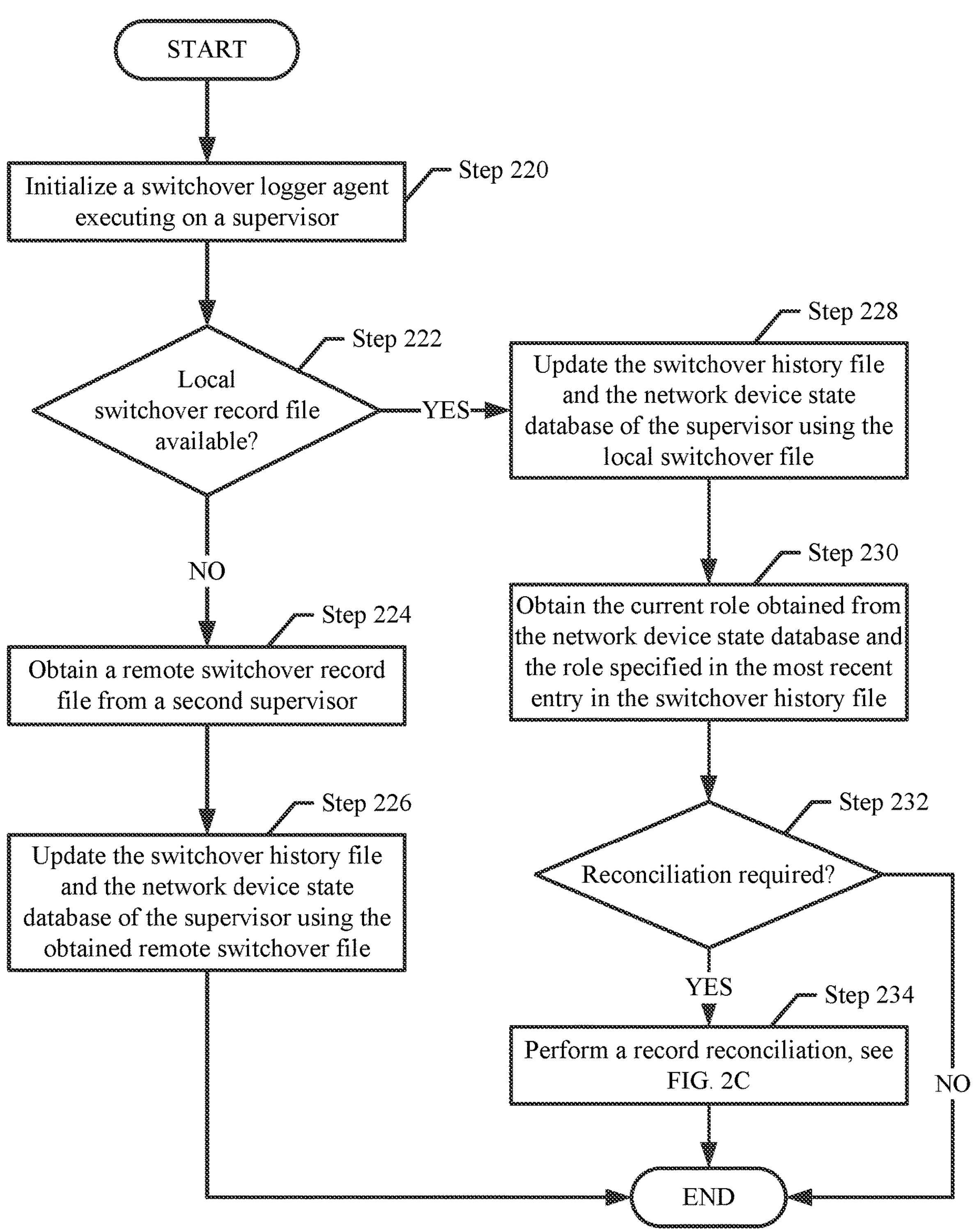
FIG. 2B shows a flowchart for a method for initiating a switchover logger agent in accordance with one or more embodiments.

FIG. 2B shows a flowchart for a method for initiating a switchover logger agent in accordance with one or more embodiments. The method of FIG. 2B may be performed by, for example, a supervisor (e.g., 110, 112, FIG. 1A). Other components illustrated in FIGS. 1A-1C may perform the method of FIG. 2B without departing from the disclosure. Further, one or more steps in FIG. 2B may be performed concurrently with one or more steps in FIGS. 2A-2C.

In step 220, a switchover logger agent executing on the supervisor is initiated. In one or more embodiments, the switchover logger agent is initiated in response to the switchover. For example, the switchover may result in a reboot by one or more supervisors. The reboot may include initializing the switchover logger agent.

In step 222, a determination is made about whether a local switchover record file is available. Such local switchover record file may be the local switchover record file discussed in FIG. 2A generated by an election manager of the active supervisor. If the local switchover record file is available, the method proceeds to step 228; otherwise, the method proceeds to step 224.

In step 224, following the determination that the local switchover record file is available, a remote switchover record file is obtained from a second supervisor. In one or more embodiments, the remote switchover record file is obtained by invoking a remote agent that communicates with the second supervisor to obtain the remote switchover record file stored in the second supervisor.

In step 226, the switchover history file and the network device state database of the supervisor are updated using the obtained remote switchover record file. In one or more embodiments of the disclosure, the switchover history file is updated by generating a new switchover entry to specify the information obtained from the remote switchover record file. Similarly, the network device state database is updated to specify the current role and to specify an updated switchover history file.

In step 228, following the determination that a local switchover record file is available, the switchover history file and the network device state database are updated using the local switchover record file. In one or more embodiments of the disclosure, the switchover history file is updated by generating a new switchover entry to specify the information obtained from the local switchover record file. Similarly, the network device state database is updated to specify the current role and to specify an updated switchover history file. Following the updates using the local switchover record file, the local switchover record file may be deleted to prevent storage of multiple local switchover record files, reducing confusion and/or processing of incorrect local switchover record files.

In step 230, the current role is obtained from the network device state database. Such current role is compared to the role specified in the most recent entry in the switchover history file. For example, if the method of FIG. 2A is performed before the method of FIG. 2B, the network device state database was updated by the election manager (see step 208 of FIG. 2A) to specify the current role. In step 230, such role specified in the network device state database is compared to the current role specified in the obtained local switchover record file to detect inconsistency. The inconsistency may be based on, for example, if the role specified in the network device state database varies from the current role specified in the local switchover record file. If an inconsistency is detected, it is determined that a reconciliation is required.

In one or more embodiments, the inconsistency may be caused by a lack of synchronization of two supervisors following a switchover. For example, consider a scenario in which two supervisors experience a switchover. A first supervisor switches from a standby role to an active role, and a second supervisor switches from the active role to the standby role. Following the switchover, the two supervisors may perform the methods of FIGS. 2A and 2B to update their respective network device state database instances to specify the role. This may further include undergoing a reboot. An election manager of the first supervisor may perform the method of FIG. 2A and generate the local and remote switchover record files, update its network device state database to specify the active role of the first supervisor, and initiate the switchover logger agent. The supervisor unexpectedly undergoes a failure during its boot. The second supervisor (expecting to be the standby supervisor), may update its network device state database according to its role and initiate the switchover logger agent. Following the failure, the election manager of the second supervisory may initiate a second switchover that results in the second supervisor being the active supervisor. The second election manager may generate second local and remote switchover record files, and the initialized switchover logger agent of the second supervisor may obtain the second local switchover record file. Following step 230, the current role of "active" specified in the second local switchover record file is compared to the specified role of its network device state database, which specifies that its role is standby. In this scenario, an inconsistency is detected.

In step 232, based on the comparison, a determination is made about whether a record reconciliation is required. If a record reconciliation is required, the method proceeds to step 234; otherwise, the method ends following step 232.

In step 234, a record reconciliation is performed. In one or more embodiments, the record reconciliation is a process to remediate the inconsistency between the role as specified in the local switchover record file and the role as specified in the network device state database.

Figure 2C:
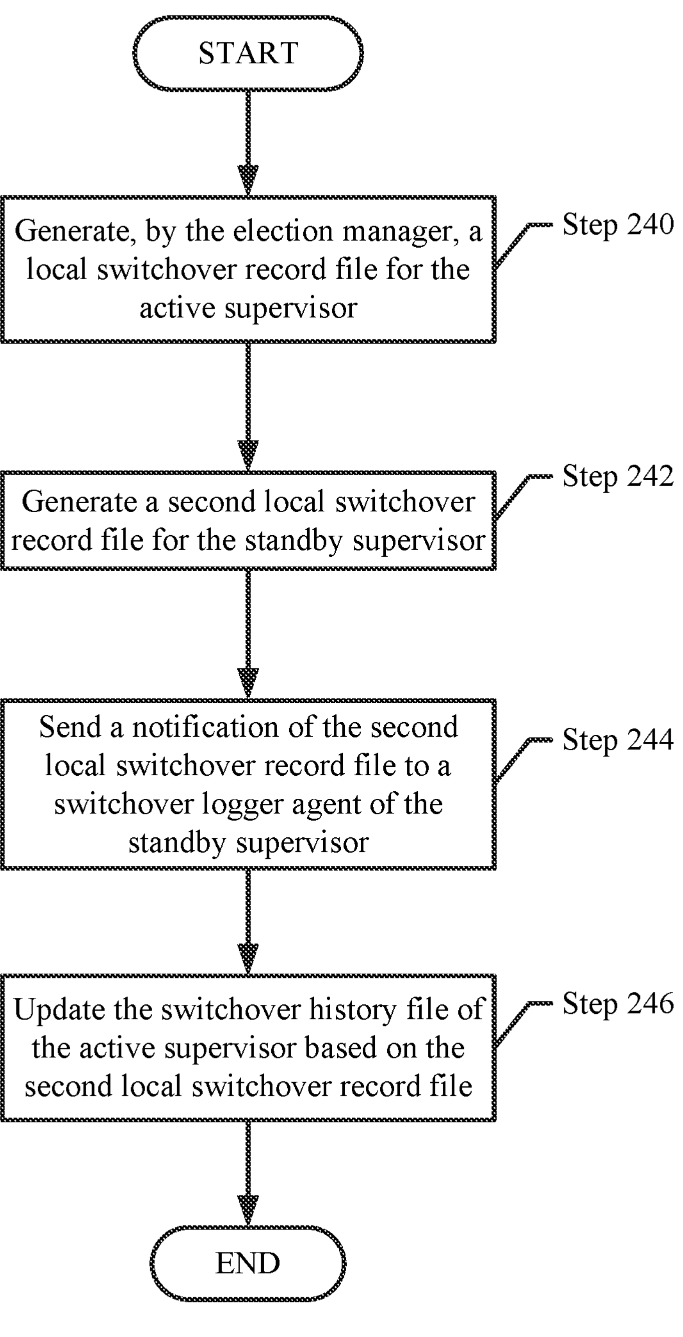
FIG. 2C shows a flowchart for a method for performing a record reconciliation in accordance with one or more embodiments.

In one or more embodiments, the record reconciliation is performed in accordance with FIG. 2C. Other methods may be used to perform the record reconciliation without departing from these embodiments.

FIG. 2C shows a flowchart for a method for performing a record reconciliation in accordance with one or more embodiments. The method of FIG. 2C may be performed by, for example, a supervisor (e.g., 110, 112, FIG. 1A). Other components illustrated in FIGS. 1A-1C may perform the method of FIG. 2C without departing from the disclosure. Further, one or more steps in FIG. 2C may be performed concurrently with one or more steps in FIGS. 2A-2C.

In step 240, a new local switchover record file is generated for the active supervisor. The local switchover may specify a new switchover performed after the inconsistency discussed in FIG. 2B is detected. Following such switchover, the new role of the supervisor is specified in the new local switchover record file.

In step 242, a second local switchover record file is generated for the standby supervisor. In one or more embodiments, the second local switchover record file may be similar to a remote switchover record file in that the second local switchover record file is intended to be read by a second supervisor.

In step 244, a notification of the second local switchover record file is sent to a switchover logger agent of the standby supervisor. In one or more embodiments, the notification is sent to specify accessing, by the switchover logger agent of the standby supervisor, the second local switchover record file to be used to update its respective switchover record file. Alternatively, the second local switchover record file is sent to the second standby switchover record file.

In step 246, the switchover history file is updated based on the second local switchover record file. In one or more embodiments, the switchover history file is updated by generating a new switchover entry to specify the information obtained from the local switchover record file.

Example

Figure 3:
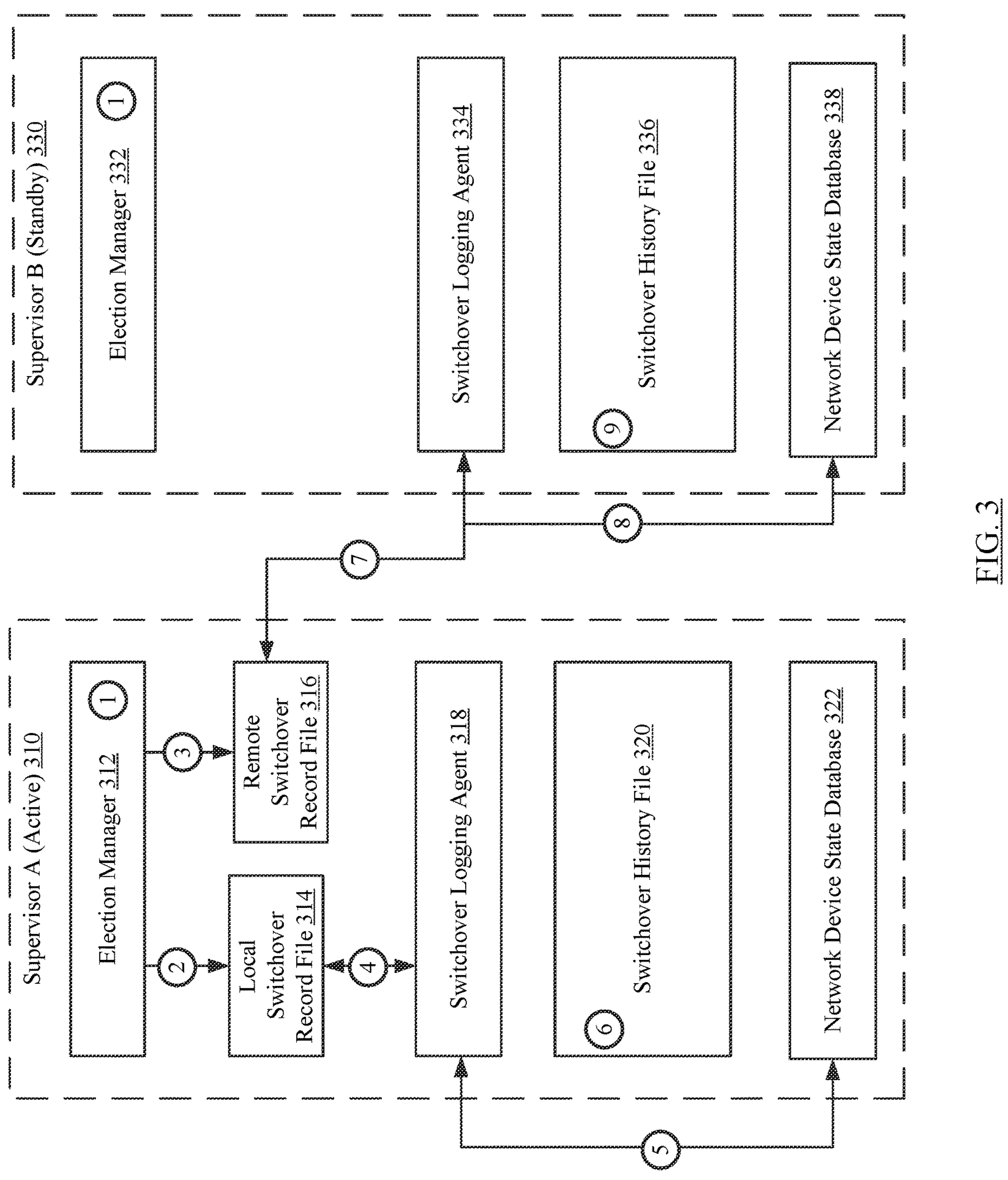
FIG. 3 shows an example in accordance with one or more embodiments.

FIG. 3 shows an example in accordance with one or more embodiments. The example is not intended to limit embodiments of the disclosure. Turning to the example, consider a scenario in which a switchover is initiated.

In FIG. 3, an election manager (312) of supervisor A (310) is notified of a switchover that results in supervisor A (310) being assigned the role of active, and supervisor, and supervisor B (330) being assigned the role of standby [1]. Following the notification on the election manager (312) about the switchover, the election manager (312) generates a local switchover record file (314) [2] and a remote switchover record file (316) [3]. Each of the local switchover record file (314) and the remote switchover record file (316) each specify the previous role of the supervisor A (310) (i.e., standby), the current role of supervisor A (310) (i.e., active), the previous protocol implemented by supervisor A (310) (in this example, the protocol is SSO) prior to the switchover, the current protocol implemented by supervisor A (310) (in this example, SSO), a timestamp of the switchover, and a description of the reason for the switchover (in this case, the description would specify this switchover was user-initiated).

Following the generation of the local switchover record file (314), the switchover logger agent (318) boots up. During its boot up, the switchover logger agent (318) obtains the local switchover record file (314) [4]. After obtaining the local switchover record agent (314), the switchover logger file (318) updates the network device state database (322) of supervisor A (310) to specify the updated role and protocol [5]. In this manner, the state of the network device (310) is updated. Further, the switchover history file (320) of supervisor A (310) is updated with a new entry that specifies the content of the local switchover record file (314) [6].

Following the generation of the remote switchover record file (316), a switchover logger agent (334) of supervisor B (330) boots up. During its boot up, the second switchover logger agent (334) obtains the remote switchover record file (316) using a remote access agent [7]. After obtaining the remote switchover record file (316), the second switchover logger agent (334) updates a network device state database (338) of supervisor A (310) to specify the updated role and protocol [8]. In this manner, the state of the network device (310) is updated. Further, the switchover history file (336) of supervisor B (330) is updated with a new entry that specifies the content of the remote switchover record file (316) [9].

End of Example

While the example illustrates both a local switchover record file and a remote switchover record file, embodiments disclosed herein may relate to an implementation where only one switchover record file is generated by the election manager. In such a scenario, the active supervisor generating the switchover record file may coordinate with the standby supervisor to enable consumption of the switchover record file following the switchover. For example, following a switchover, the election manager of the active supervisor generates the switchover record file and sends a notification to the standby supervisor that specifies the switchover record file. The standby supervisor may read the switchover record file to update its corresponding instance of the network device state database and switchover history file. Following this, the standby supervisor may notify the active supervisor of the consumption. The active supervisor may delete the switchover following the notification without departing from the invention.

Further, while embodiments disclosed herein relate to a switchover history file being stored in the network device, the switchover history file may be stored in a persistent storage that is external to both the network device and the corresponding supervisor. For example, the supervisors managing a switchover history file in an external storage may send the obtained local switchover record file or remote switchover record file to the entity storing the switchover history file to perform the update to the switchover history file as discussed throughout this disclosure. The external persistent storage may be operatively connected to the network device via the network discussed throughout this disclosure.

Continuing the above-referenced example, embodiments disclosed herein may further include a controller external to the network device that stores the switchover history file and includes functionality for initiating switchovers. Further, the controller may include functionality for orchestrating the updating of the switchover history file following a switchover. For example, the controller may send requests to the now-active supervisor that specifies generating the local and/or remote switchover record files. Further, the orchestration may include notifying the now-standby supervisor of the remote switchover record file that is now available for consumption.

Further, the controller may include functionality for obtaining a stream of state information from each of the supervisors. As a controller identifies that a switchover is required (e.g., when the state information specifies the active supervisor is not in an operational state), the controller may initiate the switchover by sending switchover requests to each of the supervisors.

Figure 4:
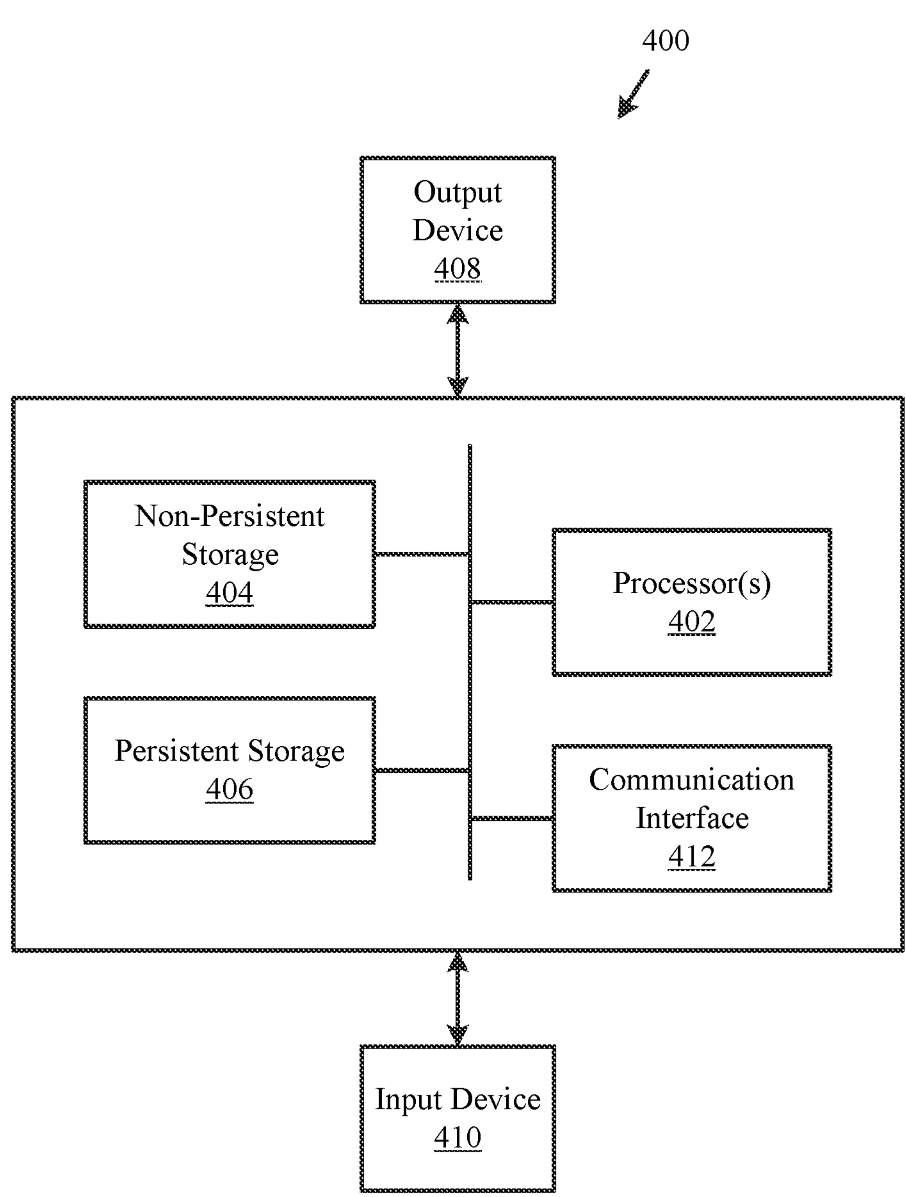
FIG. 4 shows a diagram of a computing device in accordance with one or more embodiments.

As discussed above, embodiments of the disclosure may be implemented using computing devices. FIG. 4 shows a diagram of a computing device in accordance with one or more embodiments of the disclosure. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one embodiment of the disclosure, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the disclosure, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of operating a supervisor executing on a network device to perform a switchover with a second supervisor executing on the network device, the supervisor being in a standby role prior to the switchover and being in an active role, in which the supervisor assumes management of controlled devices on the network device, after the switchover and the second supervisor being in an active role prior to the switchover, the method comprising:

initializing a switchover logger agent executing on the supervisor responsive to the switchover;

obtaining, by the switchover logger agent executing on the supervisor, a local switchover record file at the supervisor that specifies the active role as a current role of the supervisor after the switchover and that specifies the standby role as a previous role of the supervisor prior to the switchover;

generating, by the supervisor, a remote switchover record file at the supervisor that specifies the standby role as a current role of the second supervisor after the switchover and that specifies the active role as a previous role of the second supervisor prior to the switchover;

providing, by the supervisor, the remote switchover record file to the second supervisor;

updating, by the supervisor, a switchover history file at the supervisor based on the local switchover record file, wherein the updated switchover history file comprises a plurality of switchover entries, including a switchover entry associated with the switchover, and wherein each of the plurality of switchover entries is associated with a unique switchover event that occurred on the network device;

deleting, by the supervisor, the local switchover record file after updating the switchover history file based on the local switchover record file; and prior to obtaining the local switchover record file at the supervisor, determining, by the supervisor, whether the local switchover record file is available at the supervisor, wherein the supervisor is configured to obtain the local switchover record file at the supervisor based on determining that the local switchover record file is available at the supervisor and is configured to obtain a remote switchover record file at the second supervisor based on determining that the local switchover record file at the supervisor is unavailable.

2. The method of claim 1, further comprising:

prior to initializing the switchover logger agent:

obtaining, by an election manager executing on the supervisor, a notification for the switchover;

making a determination that the switchover indicates the supervisor is in the active role; and based on the determination that the switchover indicates the supervisor is in the active role:

generating the local switchover record file; and updating a network device state database instance to indicate the active role, wherein the remote switchover record file is generated based on the determination that the switchover indicates the supervisor is in the active role.

3. The method of claim 1, further comprising:

after updating the switchover history file:

obtaining a current role from a network device state database instance;

making a determination, based on the current role from the network device state database instance, that a reconciliation is required; and based on the determination that the reconciliation is required:

generating, by an election manager of the supervisor, a second local switchover record file;

sending the second local switchover record file to the second supervisor; and updating the network device state database instance based on the second local switchover record file.

4. The method of claim 1, wherein the switchover history file at the supervisor is not updated based on the remote switchover record file at the supervisor.

5. The method of claim 1, wherein the switchover is initiated based on a failover of the second supervisor executing on the network device.

6. The method of claim 1, wherein the switchover is user-initiated.

7. The method of claim 1, wherein the local switchover record file at the supervisor is not provided to the second supervisor.

8. A method of operating a supervisor executing on a network device to perform a switchover with a second supervisor executing on the network device, the supervisor being in a standby role prior to the switchover and being in an active role after the switchover, the method comprising:

determining, after the switchover, whether the supervisor is in the active role;

based on determining that the supervisor is in the active role, generating, by the supervisor, a local switchover record file at the supervisor that specifies the active role as a current role of the supervisor after the switchover and that specifies the standby role as a previous role of the supervisor prior to the switchover;

based on determining that the supervisor is in the active role, generating, by the supervisor and prior to a boot up of a switchover logger agent executing on the second supervisor, a remote switchover record file at the supervisor that specifies the standby role as a current role of the second supervisor after the switchover and that specifies the active role as a previous role of the second supervisor prior to the switchover;

communicating, by the supervisor, with the second supervisor to provide the remote switchover record file to the second supervisor during the boot up of the switchover logger agent executing on the second supervisor;

updating, by the supervisor, a switchover history file at the supervisor based on the local switchover record file, wherein the updated switchover history file comprises a plurality of switchover entries including a switchover entry associated with the switchover; and determining, by the supervisor, whether the local switchover record file is available at the supervisor, wherein the supervisor is configured to obtain the local switchover record file at the supervisor to update the switchover history file at the supervisor based on determining that the local switchover record file is available at the supervisor and is configured to obtain a remote switchover record file at the second supervisor based on determining that the local switchover record file at the supervisor is unavailable.

9. The method of claim 8, wherein the local switchover record file at the supervisor is not provided to the second supervisor during the boot up of the switchover logger agent executing on the second supervisor.

10. The method of claim 8, further comprising:

after updating the switchover history file:

obtaining a current role from a network device state database instance;

making a determination, based on the current role from the network device state database instance, that a reconciliation is required; and based on the determination that the reconciliation is required:

generating, by an election manager of the supervisor, a second local switchover record file;

sending the second local switchover record file to the second supervisor; and updating the network device state database instance based on the second local switchover record file.

11. The method of claim 8, wherein the switchover history file at the supervisor is not updated based on the remote switchover record file at the supervisor.

12. The method of claim 8, wherein the switchover is initiated based on a failover of the second supervisor executing on the network device.

13. The method of claim 8, wherein the switchover is user-initiated.

14. The method of claim 8, wherein the second supervisor is configured to update a second switchover history file at the second supervisor based on the remote switchover record file provided to the second supervisor during the boot up of the switchover logger agent executing on the second supervisor and wherein the boot up of the switchover logger agent is performed for a reboot of the second supervisor.

15. A method for managing a switchover between a supervisor and a second supervisor executing on a network device, the supervisor being in a standby role prior to the switchover and being in an active role after the switchover, the method comprising:

determining, after the switchover, whether the supervisor is in the active role;

based on determining that the supervisor is in the active role, generating, by the supervisor, a local switchover record file at the supervisor containing supervisor-readable content about the switchover, wherein the supervisor-readable content contains a previous role of the supervisor and a current role of the supervisor;

based on determining that the supervisor is in the active role, generating, by the supervisor, a remote switchover record file at the supervisor containing second-supervisor-readable content about the switchover, wherein the second-supervisor-readable content contains a previous role of the second supervisor and a current role of the second supervisor;

after generating the remote switchover record file and during a reboot of the second supervisor in the standby role after the switchover, providing, by the supervisor, the remote switchover record file at the supervisor to the second supervisor, wherein the second supervisor is configured to update a switchover history file at the second supervisor to generate a new switchover entry in the switchover history file at the second supervisor containing the second-supervisor-readable content;

updating, by the supervisor, a switchover history file at the supervisor based on the local switchover record file to generate a new switchover entry in the switchover history file at the supervisor containing the supervisor-readable content, wherein the updated switchover history file at the supervisor comprises a plurality of switchover entries; and determining, by the supervisor, whether the local switchover record file is available at the supervisor, wherein the supervisor is configured to obtain the local switchover record file at the supervisor to update the switchover history file at the supervisor based on determining that the local switchover record file is available at the supervisor and is configured to obtain a remote switchover record file at the second supervisor based on determining that the local switchover record file at the supervisor is unavailable.

16. The method of claim 15, wherein the switchover history file at the supervisor is not updated based on the remote switchover record file at the supervisor.

17. The method of claim 16, wherein the local switchover record file at the supervisor is not provided to the second supervisor during the reboot of the second supervisor in the standby role after the switchover.

18. The method of claim 16, wherein the switchover history file at the second supervisor is not updated based on the local switchover record file at the supervisor.

* * * * *